United States Patent [19]

Akashi et al.

[11] Patent Number: 4,695,321

[45] Date of Patent: Sep. 22, 1987

[54] DYNAMIC COMPACTION OF COMPOSITE MATERIALS CONTAINING DIAMOND

[75] Inventors: Tamotsu Akashi, Socorro, N. Mex.; Akira Sawaoka, Yokohama, Japan

[73] Assignee: New Mexico Tech Research Foundation, Socorro, N. Mex.

[21] Appl. No.: 858,449

[22] Filed: May 1, 1986

Related U.S. Application Data

[63] Continuation-in-part of Ser. No. 747,558, Jun. 21, 1965, Pat. No. 4,655,830.

[51] Int. Cl.[4] .............................................. C22C 29/00

[52] U.S. Cl. ...................................... 75/243; 100/911; 264/60; 264/84; 264/125; 419/11; 419/38; 419/45; 428/408; 428/551; 428/552; 428/940; 501/99

[58] Field of Search ...................... 75/243; 419/66, 45, 419/11, 38; 428/551, 552, 408, 940; 501/99; 264/60, 84, 125; 100/911

[56] References Cited

U.S. PATENT DOCUMENTS

| | | | |
|---|---|---|---|
| 2,648,125 | 8/1953 | McKenna et al. | 29/160.5 |
| 3,372,010 | 3/1968 | Parsons | 51/309 |
| 3,752,665 | 8/1973 | Roy et al. | 75/135 |
| 4,171,973 | 10/1979 | Hara et al. | 75/237 |
| 4,255,374 | 3/1981 | Lemcke et al. | 264/111 |
| 4,275,050 | 6/1981 | French et al. | 423/446 |
| 4,334,928 | 6/1982 | Hara et al. | 75/238 |
| 4,352,787 | 10/1982 | French et al. | 423/446 |
| 4,442,180 | 4/1984 | Hara et al. | 428/551 |
| 4,490,329 | 12/1984 | Hare et al. | 419/51 |
| 4,505,746 | 3/1985 | Nakai et al. | 75/243 |
| 4,594,104 | 6/1986 | Reybovld | 419/53 |
| 4,655,830 | 4/1987 | Akashi et al. | 75/233 |

*Primary Examiner*—Stephen J. Lechert, Jr.
*Attorney, Agent, or Firm*—Deborah A. Peacock

[57] ABSTRACT

This invention relates to high-hardness, high-toughness, high-density composite materials containing diamond, and a process for making such materials comprising applying shock compression to the composite powders and inducing an exothermic chemical reaction. The process is useful in making metal, ceramic and cermet diamond composite materials.

14 Claims, 16 Drawing Figures

FIG.6a TOP

FIG.6b BOTTOM

10μm

FIG. 1a
TOP
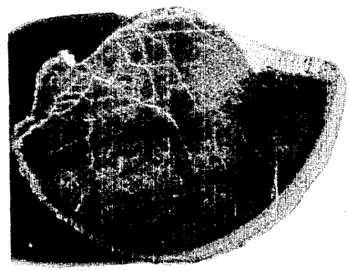
FIG. 1b
BOTTOM
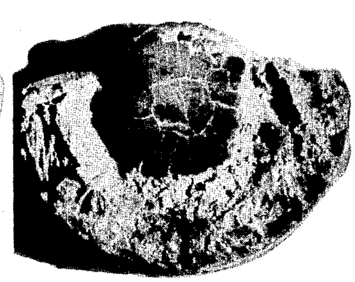
FIG. 2a
TOP
FIG. 2b
BOTTOM
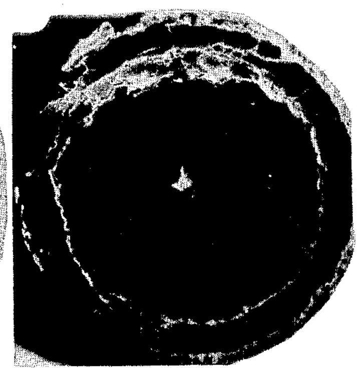
FIG. 3a
TOP
FIG. 3b
BOTTOM
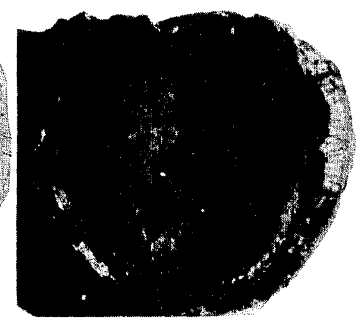

FIG.4a
TOP
FIG.4b
BOTTOM
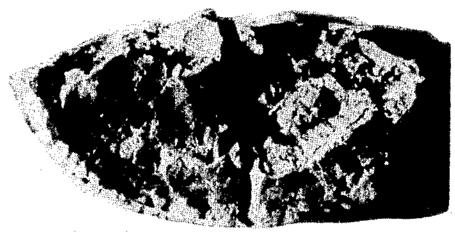
FIG.5a
TOP
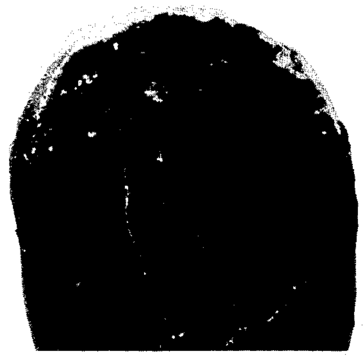
FIG.5b
BOTTOM
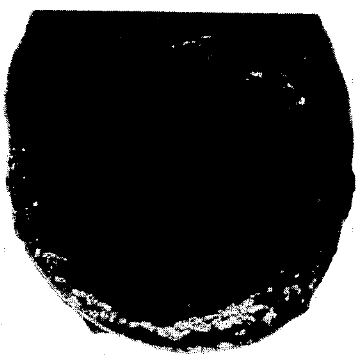

TOP (b)

BOTTOM

10 μm

TOP

BOTTOM

10 μm

TOP

BOTTOM

10μm

DYNAMIC COMPACTION OF COMPOSITE MATERIALS CONTAINING DIAMOND

CROSS-REFERENCE TO A RELATED APPLICATION

This application is a continuation-in-part application of U.S. patent application Ser. No. 747,558 now U.S. Pat. No. 4,655,830, entitled HIGH DENSITY COMPACTS, to Akashi et al, filed on June 21, 1985, the teachings of which are incorporated herein by reference.

BACKGROUND OF THE INVENTION

This invention relates to a process for making high-hardness and high-toughness diamond composite materials, and in particular, diamond-metal, diamond-ceramic, and diamond-metal-ceramic (cermet) composite materials.

The prior art discloses the manufacture of composite materials by heating and compressing the composite powders. Mechanical pressures are generally used in the prior art. Various heating means are employed in the prior art, including ovens and the like. More recently, in the prior art, the heating is achieved by burning exothermic reaction mixtures such as thermite compositions, intermetallic reactions and the like. The exothermic powder is either mixed in the powder to be compressed, or fired as a separate layer adjacent to the composite material. Typical prior art methods are described below.

Certain kinds of ceramic, metal and cermet composite materials can be synthesized by utilizing an exothermic reaction between the elemental constituents of these materials without any external heating. This processing technique is termed "Self-Propagating High-Temperature Synthesis," and has been abbreviated as SHS, SHTS and SUS. SHS processing has been investigated in the Soviet Union since 1967, and over 200 phases have been produced by this technique. Exothermic reactions have been utilized for many years in the United States for a variety of heat requirements and pyrophoric applications. It is only recently that this processing technique has been explored as a method for synthesis and sintering of ceramic, metal and cermet composite materials.

In SHS processing, a strong exothermic reaction, ignited at one end of a compact of mixed precursory powders by heating (using electric spark, hot wire, ion beam, etc.), propagates spontaneously in the compact and passes through the whole sample. An example of this reaction is the synthesis of titanium diboride ($TiB_2$) from titanium and boron powders. This reaction can be expressed as:

$$Ti+2B \rightarrow TiB_2 \quad \Delta H = 66.8 \text{ kcal/mol (at } 298^\circ \text{ K.)}$$

The adiabatic temperature resulting from this reaction is calculated to be 3190° K. (assuming that all of the reaction heat contributes to increase the temperature of the reaction product), which corresponds to the melting point of $TiB_2$. This particular reaction is self-sustaining. Self-sustaining reactions can occur only when a product phase is liquid or partially liquid at the reaction temperature. Therefore, not all exothermic reactions are self-sustaining.

Currently, fundamental research and applications of SHS processing are progressing. A. P. Hardt and P. V. Phung have proposed a simple, diffusion-limited, reaction model and evaluated the exothermic reaction rates. They have found that reaction rate depends on two factors: (1) a heat transfer which is sufficiently low to allow accumulation of heat in the reaction zone; and (2) system characteristics of particle size and fusion temperature which are sufficiently small to promote a high rate of mass transfer. Hardt and Phung have shown experimentally that reaction characteristics can be altered by using suitable additives which alter the thermal conductivity. Table 1 shows some influential factors of physical and chemical characteristics of precursory powders on SHS reaction and product.

TABLE 1

Relation of SHS Characteristics to the Physical and Chemical Properties of the Starting Materials

| | INFLUENCE OF PRECURSOR PHYSICAL CHARACTERISTICS | INFLUENCE OF PRECURSOR CHEMICAL CHARACTERISTICS |
|---|---|---|
| REACTION CHARACTERISTICS | Adiabatic Temperature<br>Conductive Heat Loss<br>Reaction Initiation | Reaction Rate<br>Reaction Mechanism<br>Volatile Evolution |
| PRODUCT CHARACTERISTICS | Densities<br>Microstructure<br>Unreacted Material | Secondary Phases<br>Impurity Content<br>Porosity |

In the area of application research, J. D. Walton, Jr. and N. E. Poulos have applied the thermite reaction to production of high-temperature resistance cermets (1959). Self-bonding zirconium disilicide-aluminum oxide cermets ($ZrSi_2$-$Al_2O_3$) were successfully produced from the thermite mixture of $ZrO_2$, $SiO_2$, and aluminum. Walton and Poulos reported some advantages of this method of production as follows: (1) inexpensive precursory powders; (2) low ignition temperature (980° C.); (3) high reaction temperature (+2760° C.); (4) short firing time; and (5) controlling the atmosphere was unnecessary. Therefore, this technique has a significant meaning for industrial production of ceramic, metal and cermet composite materials.

During the American Ceramic Society's 86th Annual Meeting (1984), there were seven presentations about thermite reactions and SHS. One of these presentations disclosed the self-sintering of materials. $TiB_2$, TiC, and compacts formed from these mixtures have a high potential for weapons systems applications. Such materials produced by conventional processes are expensive because powders with suitable properties for sintering are needed, and high-temperature and high-pressure sintering of these powders are required to produce high-strength materials. On the other hand, by using SHS processing, it may be possible to produce strongly bonded materials with desired phases from precursory powder mixtures by igniting only one end of the compact at room temperature. N. D. Carbin et al. examined the effect of precursory powder characteristics of resulting products in the system Ti-B-C and showed that mixtures containing fine titanium powder are easier to ignite and have slower reaction rates, but the products are more porous than those containing coarse powder. Furthermore, reaction rates in the mixtures using $B_4C$ for the boron and carbon elements decreased about 100 times and partially sintered products containing $TiB_2$ and TiC were produced. The resulting products seemed to be considerably porous.

Recently, high-pressure, self-combustion sintering for ceramics, utilizing this SHS processing technique, were demonstrated from cooperative research by Osaka University and Sumitomo Electric Industries Ltd. in Japan. Their attempt is to eliminate the porosity in products produced by SHS by applying high pressure during the SHS process. It is reported that a dense $TiB_2$ sintered compact was produced in a few seconds by electric ignition of a pressed titanium and boron mixture at 3 GPa; the relative density and microhardness value of the center region in the high pressure reaction cell was 95% and 2000 kg/mm$^2$ for a 200 g load, respectively. This result suggests that the application of high pressures to SHS processing is very effective in eliminating porosity and has the potential of producing strong, dense ceramic compacts. However, in this high-pressure, self-combustion process, expensive and complicated high-pressure apparatuses and assemblies are required; the expense and complication is similar to conventional high-pressure sintering techniques.

U.S. Pat. No. 4,255,374, to Lemcke et al, discloses a method of compacting interweldable powder materials into a solid body by using a shock wave. This patent does not disclose the use of shock or explosive compression to produce an exothermic chemical reaction or alloying between the powder ingredients. This patent discloses that such chemical reactions or alloying, in particular with respect to diamond powders, would be undesirable because of a general decrease in the hardness and wear resistance of the resulting product.

U.S. Pat. Ser. No. 747,558 discloses an inexpensive method for producing high density compacts of refractory ceramics, ceramic composites, cermets and other high hardness materials. The method comprises applying explosive shock to the compact to produce exothermic sintering and bonding of the compact powder materials.

A comprehensive article on the prior art formation of intermetallic compounds, most of which are formed exothermically, is an article entitled "Intermetallic Compounds: Their Past and Promise," set forth in *Metallurgical Transactions A,* Volume 8A, Sept. 1977, at page 1327 et seq. This article records the 1976 Campbell Memorial Lecture at the American Society for Metals. Attention is directed particularly to the footnotes and the literature references at the end of this article.

Another article pertaining to prior art exothermic reactions is "Propagation of Gasless Reactions in Solids," by A. P. Hardt and P. V. Phung, 21 *Combustion and Flame,* pages 77-89 (1973). This article sets forth an analytical study of exothermic intermetallic reaction rates.

Polycrystalline diamond is tougher than single crystalline diamond because of the random orientation of the crystal (no significant cleavage). Both polycrystalline and single crystalline diamond have a high hardness. Thus, natural and synthesized polycrystalline diamond composite materials are useful in cutting tools, wire-drawing dies and rock-drilling bits. Particularly in rock-drilling applications, high hardness and high toughness materials are required. Diamond cutting tools are being used in the automobile, airframe manufacturing and aircraft engine propulsion industries. The work materials in these fields are mainly aluminum alloys with a high silicon content, nickel- and titanium-based alloys, and gray cast irons. In recent years, high speed machine technology has been developed in the industries mentioned above in order to reduce machining costs and to increase productivity. For this purpose, tool materials with a high hardness and high toughness are required. Ceramic tool materials such as $Si_3N_4$-based ceramics, $ZrO_2$-based ceramics, and SiC-whisker reinforced alumina are being successfully developed and commercialized for high-speed machining of superalloys and cast irons. However, most attractive and effective tool materials comprise polycrystalline diamond because of the high hardness and high toughness properties. As an example, a comparison of the cutting performance of diamond tool and conventional cemented carbide tool is shown in Table 2. This table was obtained from 208 *Science,* R. H. Wentorf, R. C. DeVries and F. P. Bundy, p. 873 (1980).

TABLE 2

Cutting Performance of Sintered Diamond Compared to Cemented Carbide

| Work Material | Total Number of Pieces Cut Per Tool |
|---|---|
| Silicon-Aluminum SAE 332 | |
| Compax Diamond Tool | 412000 |
| Cemented Carbide | 2400 |
| Rubber filled with nickel and aluminum powder | |
| Compax Diamond Tool | 6000 |
| Cemented Carbide | 140 |
| Type 390 Aluminum | |
| Compax Diamond Tool | 12000-14000 |
| Cemented Carbide | 3000 |
| Glass Filled Polypropylene | |
| Compax Diamond Tool | 7000 |
| Cemented Carbide | 400 |

Some kinds of natural polycrystalline diamonds such as framesite, carbonado and ballas, are available for cutting tools and rock-drilling bits, but the amount of these materials is limited. Thus, most of the polycrystalline diamond for industrial applications has to be produced by means of high-pressure sintering techniques using diamond powder. Diamond is a typical, strong, covalently bonded material, and is unstable at high temperatures under ambient pressure. The sintering of diamond powders at high pressures and high temperatures has been studied by many investigators in the prior art. Stromberg and Stevens, 49 *Ceramic Bulletin,* p. 1030 (1970) and Hall, 169 *Science,* p. 868 (1970) reported the sintering of diamond with and without additives which were not useful as catalysts for diamond formation. The additives in their compacts served solely as a binder of diamond grains. Sintered diamond compacts with densities of 3.29 to 3.48 g/cm$^3$ and compressive strengths of 4.4 to 5.8 GPa were produced. However, these references pointed out that the surface transformation of diamond particles into low pressure forms during the sintering was a major problem in using this technique. On the other hand, Katzman and Libby, 172 *Science,* p. 1132 (1971), and Notsu et al., 12 *Materials Research Bulletin,* p. 1079 (1977) reported the sintering of diamond powders using additives such as iron, nickel and cobalt, which can act as a catalyst for diamond formation. In this prior art sintering technique, the mechanical properties of the resulting compacts strongly depend upon the amount of additives. It is reported that extensive diamond-diamond bonding was successfully produced in the compacts during the sintering process. Sintered polycrystalline diamond compacts produced by this technique are being commercialized and used for many industrial applications in the prior art.

The use of sintered diamond compacts can be expected to gradually increase in the automobile and aerospace industries in order to machine high-performance superalloys. Such compacts will also be useful in the high-speed machining of conventional and new materials. Especially, in these industries, there will be an increased demand for materials which are capable of cutting high-performance structural ceramics such as $Al_2O_3$, $Si_3N_4$ and SiC based ceramics and their pure materials. Sintered diamond appears to be the most effective and promising tool material for such machining due to its excellent mechanical and thermal properties. However, in the prior art, the extremely high price of sintered diamond compacts, compared to that of conventional cemented carbide and ceramic tools (about 20 times higher per corner available to cutting), is one of the factors preventing a wide usage of this material in industry. The high price of this material in the prior art is partially due to the high capital and operating costs of high pressure apparatuses in producing polycrystalline diamond compacts.

SUMMARY OF THE INVENTION

This invention relates to improved composite materials containing diamond. This invention further relates to a process of making composite materials containing diamond through dynamic compaction of powder materials and exothermic reaction sintering. Dynamic compaction is achieved by utilizing a shock compression technique. The diamond composite materials formed by the process of the invention have a high hardness, high toughness, and high density.

In accordance with the invention, a powder mixture containing diamond powder with exothermically reactive additives is dynamically compressed. The dynamic compression induces and allows an exothermic chemical reaction between the powder materials to proceed throughout the compact. This chemical reaction produces a composite material having improved mechanic properties due to strong interparticle bonding.

The preferred exothermically reactive additives are boron, silicon, aluminum, transition metals, and mixtures and compounds thereof, including but not limited to carbides, oxides, nitrides, carbonitrides, borides, and silicides. The preferred particle size of the starting diamond powder is between 0.05 to 1000 microns.

The starting materials are thoroughly mixed and placed into a capsule or container which can be shock compressed. The capsule is then dynamically compressed by shock wave means, common to the art. The shock wave initiates or induces an exothermic chemical reaction which proceeds throughout the compact without requiring external heating.

The primary object of the present invention is an improved composite material containing diamond, having high hardness, high toughness, and high density.

It is a further object of the invention to produce diamond composite materials which are useful in cutting tools and rock-drilling bits.

Yet another object of the present invention is to produce diamond composite materials by means of a dynamic shock compression and exothermic sintering process.

Other objects and further scope of applicability will become apparent from the detailed description to follow and the accompanying drawing.

BRIEF DESCRIPTION OF THE DRAWING

FIG. 1 consists of sectional view microphotographs of the product of the invention of 100% by volume compacted 10–20 μm grade diamond powder having an initial density of 60%, with FIG. 1 (*a*) showing the top surface and FIG. 1(*b*) showing the bottom surface (magnification 7×);

FIG. 2 consists of sectional view microphotographs of the product of the invention of compacted 10–20 μm grade diamond containing 7.2% by volume silicon as an additive, with FIG. 2(*a*) showing the top surface and FIG. 2(*b*) showing the bottom surface (magnification 7×);

FIG. 3 consists of sectional view microphotographs of the product of the invention of compacted 10–20 μm grade diamond containing 7.2% by volume titanium as an additive, with FIG. 3(*a*) showing the top surface and FIG. 3(*b*) showing the bottom surface (magnification 7×);

FIG. 4 consists of sectional view microphotographs of the product of the invention of 100% by volume compacted 2–4 μm grade diamond, with FIG. 4(*a*) showing the top surface and FIG. 4(*b*) showing the bottom surface (magnification 7×);

FIG. 5 consists of sectional view microphotographs of the product of the invention of compacted 2–4 μm grade diamond containing 7.2% by volume silicon, with FIG. 5(*a*) showing the top surface and FIG. 5(*b*) showing the bottom surface (magnification 7×);

DESCRIPTION OF THE PREFERRED EMBODIMENT

Figures 6A, 6B:
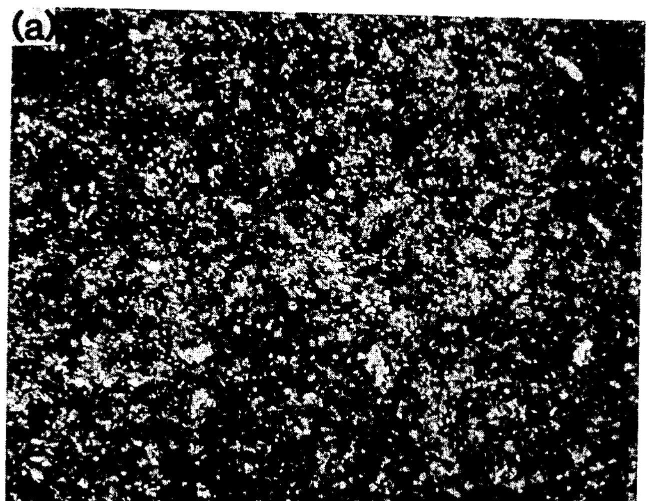
FIG. 6 consists of sectional view microphotographs of the product of the invention of 100% by volume compacted 10–20 μm grade diamond, with FIG. 6(*a*) showing a polished top surface and FIG. 6(*b*) showing a polished bottom surface (magnification 10 μm per centimeter)

This invention relates to improved composite materials containing diamond, and a process for making such improved composite materials. The improved composite materials have improved mechanical properties, including high hardness, high toughness, and high density.

In accordance with the invention, diamond powder is preferably mixed with exothermically reactive additives and other starting materials and dynamically compressed. The diamond powder may be natural or synthesized (man-made) single crystalline or polycrystalline diamond. The diamond in the starting mixture is at a high pressure phase. After release of the shock pressure, a portion of the diamond powder is transformed into the low pressure phases of carbon at a residual temperature (called "reverse transformation"). These low pressure phases exothermically and chemically react with the additives, in accordance with the invention, to produce strong interparticle bonding and the improved mechanical properties of the resulting compacts produced by the invention.

Exothermically reactive additives, useful in the invention, comprise at least one of the following:

(1) Boron, silicon, or aluminum, or mixtures or compounds thereof;
(2) Transition metals, or mixtures or alloys thereof;
(3) Non-stoichiometric carbides, oxides, nitrides or carbonitrides of the materials in (1); and
(4) Non-stoichiometric carbides, oxides, nitrides, carbonitrides, borides or silicides of the materials in (2).

Non-stoichiometric compound additives, rather than stoichiometric compound additives, are preferable constituents in the starting materials of the invention, because of the interparticle bonding which occurs during the exothermic chemical reaction. This interparticle bonding is partially responsible for the improved mechanical properties of the composite product.

The size of the additive powders are preferably smaller than the diamond powder in the starting mixture to allow for uniform mixing. To obtain uniform distribution of the additives, the additives may be coated on the diamond grains. Coating might be more effective than mechanical mixing of the powders, especially for fine grain diamond powders. The particle size of the diamond is preferably between 0 grade to 1000 grade. The starting powders should be thoroughly mixed before dynamic compaction. The powders may be compressed, by means common to the art, prior to the dynamic compaction process. Typical initial densities of the powder materials, prior to dynamic compaction, range between 30% to 90%, and preferably between 40% to 80%.

The amount of the exothermically reactive additives to be mixed with the starting materials containing diamond depends on the characteristics of the powders (diamond and additives), the content of the diamond in the starting materials and the dynamic compaction conditions. The preferred amount of additive is between 0.05% to 40% by volume of the diamond content in the starting materials. Preferably, the content of diamond in the starting mixture is between 40.0% to 99.9% by volume.

The addition of exothermically reactive additives, which can be chemically reacted with reverse-transformed carbon and/or graphite, into the starting composite powder mixtures containing diamond has two primary effects. One effect is an increase in microhardness of the resulting compact. This is most likely due to the formation of substantial interparticle bonding during the compaction process. The other effect is a reduction of macro- and micro-cracks in the recovered compacts. This is most likely due to the increase in fracture toughness of compacted diamond powders because of the additives.

Starting materials, useful in the invention, in addition to diamond and exothermically reactive additives, are ceramic, metal and cermet compounds, common to the art.

Dynamic compaction is the powder compaction process used in making the diamond composite materials of the present invention. This process, disclosed in U.S. patent application Ser. No. 747,558, involves unique densification and consolidation processes for powder materials. The dynamic compaction process comprises the passage of a shock wave through the powder composite materials or compact. The shock wave may be generated by the detonation of an explosive or by high velocity impact. In the dynamic compaction process, powder compacts are mainly densified by particle fracture and/or plastic deformation at the shock front. Subsequently, the powders are consolidated into strong compacts, sometimes through interparticle bonding associated with a localized high temperature rise during the dynamic-compaction process. The shock wave induces the exothermic sintering of the powder materials, and allows the chemical reaction between the additives and the diamond and between the additives and reverse-transformed carbon and/or graphite to proceed throughout the compact.

The dynamic compaction process is useful in the consolidation and densification of diamond powders, with or without additives. With dynamic compaction, the high-pressure and high-temperature conditions required for sintering diamond powders are relatively easy and fast to produce; a shock wave is used to compress powders in the dynamic compaction process rather than the prior art method of utilizing static high pressure sintering techniques. The duration of the shock pressure is extremely short, generally only a few microseconds. Furthermore, in dynamic compaction, the expensive processing equipment or apparatuses, such as the high-pressure apparatus used in static high-pressure sintering, is not required.

In conventional shock compression techniques, temperatures during and after shock compression cannot be independently controlled. This results in significant undesirable effects on dynamically compacted materials such as diamond and cubic boron nitride (c-BN), because high pressure phases are converted to low pressure phases at the high temperatures present after release of the shock pressure (called "residual temperature"). In the case of diamond, the diamond is at a high pressure phase, and it converts into low pressure phases such as carbon and/or graphite at high temperatures. These low pressure phases have a lower hardness and density than the high pressure phase of diamond. Conversion to the low pressure phase also significantly reduces interparticle bonding of the composite materials because this transformation takes place preferentially at grain boundaries. These effects result in a significant degradation of the mechanical properties of the resulting composite. In the present invention, which uses dynamic compaction of diamond powders, with or without additives, the diamond structure is preserved. The low pressure phases, which are transformed from the diamond (high pressure phase) due to an increased temperature, are converted into hard, refractory materials by a chemical reaction. The additives, mixed into the diamond composite starting materials, enhance the consolidation of the composite materials and enable the formation of extensive interparticle bonding of the powders during the dynamic compaction process. The resulting composite materials have excellent mechanical properties.

The dynamic compaction process, useful in forming the diamond composite materials of the present invention, is described in detail in U.S. patent application Ser. No. 747,558. For purposes of dynamic compaction in the present invention, shock wave generators, common to the art, may be utilized. The theory and practice of shock wave generators and their use for other purposes is described throughout the explosive literature. A typical disclosure is that made by Dr. M. A. Cook in his book entitled *The Science of High Explosives,* published by the Reinhold Company. Chapter 10 of the first edition is particularly comprehensive in its explanation. Shock wave generators, however, have not been used in the prior art to induce the exothermic sintering of compactable powders, and in particular composite materials containing diamond.

In one shock wave generator described in U.S. patent application Ser. No. 747,558, detonation of an explosive propels glass into a main explosive, resulting in a plane detonation. By the detonation of the main explosive, the flyer plate is propelled against a capsule containing the powder sample at a particular velocity, causing a plane shock wave to be transmitted to the sample through the capsule.

Another common type of plane shock wave generator has two different explosives: an inside explosive with a detonation velocity (Vd1) which is lower than the detonation velocity (Vd2) of an outside explosive. The angle $\phi$ is determined by the following equation: Sin $\phi$ is equal to (Vd1/Vd2). Plane detonation is transmitted to the outside explosive. By this detonation the flyer plate is propelled against a capsule containing the powder sample at a determined velocity. The plane shock wave is transmitted to the sample through the capsule.

A typical cylindrical shock wave assembly, useful in the present invention, functions as follows: A detonator is ignited, the detonation top travels down the tube wall at a determined velocity and thereby generates a cylindrical shock wave which compresses the powder sample and capsule.

EXAMPLE 1

Diamond powders with various grain sizes (2-4 μm, 10-20 μm and 40-60 μm grades) were dry-mixed with exothermically reactive additives (mixtures of titanium and boron (Ti-B) or silicon and carbon (Si-C)) and with TiC or SiC powders in the compositions shown in Table 3. These exothermically reactive materials (Ti-B and Si-C), had a stoichiometric composition corresponding to $TiB_2$ and SiC. The mixtures and pure diamond powders (for comparison) were pressed into stainless steel capsules with initial densities of 60-69% of theoretical density and then shock-compressed.

Shock treatments were carried out using a mousetrap planewave generator and a momentum-trap recovery system. An iron flyer plate with a 4.3 mm thickness was impinged upon capsules containing composite materials at velocities of 2.1 km/sec. Shock pressure induced in the stainless steel capsules was estimated to be about 50 GPa from a one-dimensional impedance matching method. Immediately after impact, fixtures containing the capsules were plunged into a water basin and quickly cooled before being recovered. After the shock treatments, samples were carefully taken out of the capusles using a lathe.

Shock loading tests in the prior art have shown than in using the above shock treatment fixture, the pressure and the temperature induced by shock loading depends strongly upon the position within the powder compact. Most noticeably, shock temperatures at the top and bottom regions at a given impact velocity differ significantly. These positions correspond to the direction or propagation of the shock wave. Powder in the bottom region has a temperature of about two times higher than in the top region at an impact velocity of 2.5 km/sec. secause of this difference, the shock-compacted materials were examined with respect to the top and bottom regions by using x-ray diffraction, scanning electron and optical microscopy, and Vicker's microhardness testing.

Both surfaces of each recovered sample were ground using a diamond wheel and then polished with a diamond paste. Vicker's microhardness measurements were taken on the polished surfaces of the compacts using a 4.8 Newton load with a loading time of 15 seconds. Microhardness values of the resulting compacts are summarized in Table 3. Microstructures of the fractures and polished surfaces of the compacted materials were observed by scanning and optical microscopy. Microphotographs are shown in the figures of the drawing.

TABLE 3

Vicker's Microhardness of Diamond Compacts (50 GPa)

| Grain Size (μm) | Constituents | Do** (%) | Microhardness ($kg/mm^2$) Top | Bottom |
|---|---|---|---|---|
| 2-4 | 100% Diamond | 65 | 1860-2400 (2030)* | 1990-2370 (2070)* |
| 2-4 | Diamond-(Ti—B) 6.5 vol % | 66 | 1140-1330 (1210) | 1750-2130 (1930) |
| 10-20 | 100% Diamond | 65 | 1820-2190 (2020) | (1200) |
| 10-20 | Diamond-(Ti—B) 6.5 vol % | 60 | 880-960 (920) | 1290-1520 (1390) |
| | | 65 | 1210-1500 (1330) | 2570-2790 (2660) |
| | | 66 | 1170-1260 (1210) | 2700-2960 (2830) |
| | | 69 | 1060-1150 (1100) | 2400-2960 (2600) |
| | Diamond-(Ti—B) 13 vol % | 66 | 1080-1130 (1090) | 2150-2380 (2230) |
| | Diamond-(Ti—B) 19.5 vol % | 66 | 680-770 (710) | 1250-1280 (1260) |
| 40-60 | 100% Diamond | 65 | 1970-2040 (2040) | (1200) |
| 40-60 | Diamond-(Ti—B) 6.5 vol % | 66 | 1130-1350 (1220) | 2700-3000 (2850) |
| 10-20 | Diamond + TiC 6.0 vol % | 66 | (1100) | (820) |
| 10-20 | Diamond + TiC 18.0 vol % | 66 | (800) | (700) |
| 10-20 | Diamond + SiC 10.8 vol % | 66 | 1350-1400 (1380) | 1910-2220 (2010) |
| 10-20 | Diamond + (Si—C) | 60 | 1780-2060 (1930) | 2450-2790 (2470) |

TABLE 3-continued

| Vicker's Microhardness of Diamond Compacts (50 GPa) | | | | |
|---|---|---|---|---|
| | | | Microhardness ($kg/mm^2$) | |
| Grain Size (μm) | Constituents | Do** (%) | Top | Bottom |
| | 10.8 vol % | 66 | 1760–2130 (1980) | 4120–4730 (4590) |

(*Average Value)
(**Initial Density)

Dependencies of microhardness on initial density of the starting powder, diamond content and diamond grain size are apparent from Table 3. These dependencies of microhardness are almost the same as those observed in dynamic compaction of c-BN powders containing exothermically reactive materials in U.S. patent application Ser. No. 747,558. Microhardness of the compacted samples increased with the additions of exothermically reactive materials, especially for larger grain-sized diamond powder. A maximum microhardness value of 4730 $kg/mm^2$ was obtained in the compacted 10–20 μm grain size diamond powder containing 10.8% by volume Si-C. There was a great difference in hardness values between the top and bottom surfaces of these samples, as shown in Table 3. Except for the compacted pure diamond powders, the higher microhardness values of the bottom surfaces of the resulting compacts compared to the top surfaces strongly suggest that for effective dynamic compaction of these powder materials to occur, higher shock temperatures than the temperatures reached at 50 GPa would be required to cause the exothermic reaction to proceed and to consolidate the powders.

X-ray diffraction patterns were taken for the compacted 10–20 μm grade diamond powders containing 10% by volume (Ti-B) or (Si-C). The exothermic reaction between titanium and boron was expected to occur during the dynamic-compaction process, analogous to the shock treatment of c-BN powders containing (Ti-B). However, x-ray diffraction patterns indicated that the titanium powders, in fact, reacted with diamond powders or reverse-transformed carbon and/or graphite to produce TiC, but did not react with boron which was intentionally added into the starting powders. Nevertheless, the formation energy of $TiB_2$ from Ti-B is lower than that of TiC from Ti-C at high temperatures under ambient pressure. Part of the TiC in the recovered compacts was possibly produced from the reaction between titanium and diamond during shock compression, but most was formed from the reaction between titanium and reverse-transformed carbon and/or graphite at a residual temperature. The preferential reaction of titanium with reverse-transformed carbon and/or graphite observed in the recovered compacts is probably due to the fact that the conversion of diamond to low pressure forms occurs preferentially at the grain boundaries and the transformed carbon and/or graphite grains have a high chemical reactivity.

The results obtained in the diamond-(Ti-B) system suggest that in the mixture system of diamond and (Si-C), Si also possibly reacted with reverse-transformed carbon and/or graphite, and not with intentionally added carbon.

In each compact obtained from the mixture of diamond and (Ti-B) or (Si-C), the amount of the TiC and SiC produced in the bottom region was greater than in the top region. This most likely occurred because the temperature in the bottom region in the shock-treatment fixture was higher than in the top region during and after shock compression. The amount of the TiC in the compacts increased with increasing initial density of the powder compacts, which corresponds to a decrease in shock and residual temperatures. Although the reason why the amount of TiC and SiC formed in the recovered compacts increased with decreasing shock and residual temperatures cannot be readily explained, these results suggest that for dynamic compaction of the mixture of diamond and (Ti-B) or (Si-C), higher pressures than 50 GPa are required to produce a well-bonded composite material containing diamond. Results of diamond powders with exothermically reactive additives compacted at higher pressures are described in the following examples.

In conclusion, the microhardness of the compacted diamond powders was increased by the addition of an exothermically reactive material into the starting powders. From x-ray diffraction patterns, it was shown that this effect resulted from the reaction between the reverse-transformed carbon and/or graphite and one of the elemental constituents of the exothermically reactive materials which were intentionally added to the starting mixture. Higher microhardness values in the bottom regions of the compacted samples than in the top regions, and an increase in microhardness values with an increase in the amount of reaction products, suggest that higher temperature and pressure conditions are required for dynamic compaction of diamond powders with exothermically reactive additives which can be reacted with reverse-transformed carbon and/or graphite.

EXAMPLE 2

Diamond powders having different grain sizes were dry mixed with exothermically reactive additives (Ti or Si) in the compositions shown in Table 4. The starting powders, diamond, Ti, and Si were the same as in Example 1. The mixed powders and pure diamond powders (for comparison) were pressed into stainless steel capsules with initial densities of 60–69% of the theoretical density and then shock compressed. Shock treatments were carried out using the same shock-treatment fixture as in Example 1. The impact velocity employed in this example was 2.5 km/sec. Shock pressures induced in the stainless steel capsules were estimated to be 60 GPa.

It was found that the microhardness of the compacted samples substantially increased with the samples containing exothermically reactive additives and also increased with a decreasing grain size of the starting diamond powders. A maximum microhardness value of 6330 $kg/mm^2$ was obtained in the compacted 2–4 μm grade diamond powder containing 7.2% by volume silicon. Another distinguishing and desirable effect of the exothermically reactive additives was the reduction of macro- and micro-cracks in the resulting compacts. This effect was predominant in the compacted fine diamond powders mixed with additives. The microhardness values for the resulting compacts are summarized in Table 4.

TABLE 4

Vicker's Microhardness of Diamond Compacts (60 GPa)

| Grain Size (μm) | Si (vol %) | Ti (vol %) | Do** (%) | Microhardness (kg/mm²) Top | Bottom |
|---|---|---|---|---|---|
| 2-4 | — | — | 65 | 4190-4600 (4380)* | 4660-5080 (4580)* |
| 2-4 | 7.2 | — | 60 | 4200-4890 (4600) | 4760-5400 (5020) |
| | | | 65 | 4870-5740 (5330) | 5750-6330 (6030) |
| | | | 69 | 4200-5200 (4630) | 4620-5460 (4940) |
| 10-20 | — | — | 60 | 670-690 (680) | 1180-1440 (1280) |
| | | | 65 | 720-820 (770) | 2100-2890 (2550) |
| | | | 69 | 760-1180 (960) | 2460-2890 (2650) |
| 10-20 | 3.6 | — | 60 | 1190-1300 (1230) | 2810-3180 (3040) |
| | | | 65 | 1150-1230 (1190) | 2860-3170 (3050) |
| | | | 69 | 830-870 (840) | 1700-1990 (1890) |
| | 7.2 | | 60 | 1500-1610 (1560) | 2150-2390 (2280) |
| | | | 65 | 2540-3030 (2700) | 3260-3530 (3380) |
| | | | 69 | 800-830 (810) | 1930-2940 (2460) |
| | 14.1 | | 60 | 2700-3220 (2920) | 3190-3710 (3390) |
| | | | 65 | 3200-3800 (3540) | 5610-5850 (5740) |
| | | | 69 | 2390-2490 (2450) | 2940-3660 (3360) |
| | — | 7.2 | 60 | 2860-3240 (3030) | 3860-3960 (3890) |
| | | | 65 | 2990-2590 (2438) | 3780-4790 (4170) |
| | | | 69 | 2380-2680 (2500) | 3690-4630 (4300) |
| 40-60 | — | — | 65 | 750-800 (770) | 2300-2960 (2610) |
| 40-60 | 7.2 | — | 60 | 2350-2540 (2440) | 3140-3340 (3250) |
| | | | 65 | 2160-2550 (2380) | 2820-3060 (2910) |
| | | | 69 | 1200-1410 (1330) | 2310-3060 (2740) |

(*Average Value)
(**Initial Density)

For pure diamond powders, it was found that the microhardness values of the compacted 10-20 μm grade and 40-60 μm grade powders were similiar. When the grain size of the starting diamond powders was decreased from 10-20 μm to 2-4 μm, the microhardness increased significantly.

Microhardness values of the compacted diamond powders were increased by the additions of silicon and titanium additives into the starting diamond powders, and also increased with a decrease in the grain size of the starting diamond powder. This is the same tendency as was shown with the compacted pure diamond powders discussed above. An advantage of using fine-grain diamond powder is that the difference in microhardness values between the top and bottom regions in each recovered compact is diminished.

It was found that the addition of titanium was more effective in increasing the microhardness of the resulting compact than the addition of silicon. The difference in powder characteristics of both powders and the chemical affinity between titanium, silicon and reverse-transformed carbon and/or graphite may have caused this result.

It was found that the optimum amount of exothermically reactive additives in the starting material powders to attain a high microhardness, strongly depends upon the volume content of diamond, grain size, size distribution of the diamond and additive powders, and dynamic compaction conditions. In the dynamic compaction of 10-20 μm grade diamond powders, with and without additives, a maximum hardness value was obtained with a 14.1% by volume silicon addition. X-ray diffraction of this compact showed that some amounts of elemental silicon remained after the dynamic compaction process. Presence of such unreacted silicon in recovered compact would result in the degradation of its mechanical properties. Thus, the optimum amount of the silicon additive in 10-20 μm grade diamond powder is most likely lower than 14.1% by volume.

X-ray diffraction patterns for the compacted diamond powders containing silicon or titanium were obtained. The amount of the reaction between the exothermically reactive additives and the reverse-transformed carbon and/or graphite was estimated from the ratio of the diffraction intensities of the peaks for SiC and Si shown in the diffraction patterns. Broadening peaks ranging from 24 to 28 degrees in $2\theta$, observed in some of these x-ray diffraction patterns, were evidence of the presence of low pressure phases of carbon transformed from diamond. Although the maximum microhardness value of 6330 kg/mm² was obtained in the compacted 2-4 μm grade diamond powder with 7.2% silicon by volume, the diffraction pattern showed that the silicon added into the starting powder mixture was not completely reacted with reverse-transformed carbon and/or graphite and traces of low pressure phases of carbon remained in the recovered compact. This may have resulted from insufficient mixing prior to the dynamic compaction, because the grain size of silicon powder used may have been too large to mix sufficiently with 2-4 μm diamond powder. It was shown from x-ray diffraction patterns that the amount of the reaction increased with a decrease in the grain size of the diamond.

Sectional views of the polished top and bottom surfaces of the compacted diamond powders, with and without additives, are shown in the microphotographs of FIGS. 1-3. FIG. 1 shows the surfaces of a compact containing 100% by volume diamond; FIG. 2 shows the surface of a compact containing diamond and 7.2% silicon by volume; and FIG. 3 shows the surfaces of a compact containing diamond and 7.2% by volume titanium. Two notable effects of the exothermically reactive additives are shown in the above figures. One effect is an increase in microhardness of the compacts with additives. The other effect was a reduction of macro- and micro-cracks in the recovered compacts, as seen by comparing the photographs of the compacted samples with additives (FIGS. 2 and 3) to compacted samples without additives (FIG. 1). The latter effect was predominant in the compacted 2–4 μm grade diamond powders with silicon additives. (Compare FIG. 4 (100% by volume diamond) to FIG. 5 (7.2% by volume silicon as an additive)). The larger number of cracks in the bottom surfaces of the compacted diamond powders, with and without additives, than in the top surfaces, as shown in FIGS. 1–5, is apparently due to the difference in the pressure and temperature conditions within the powder compacts during dynamic compaction.

Figures 7A, 7B:
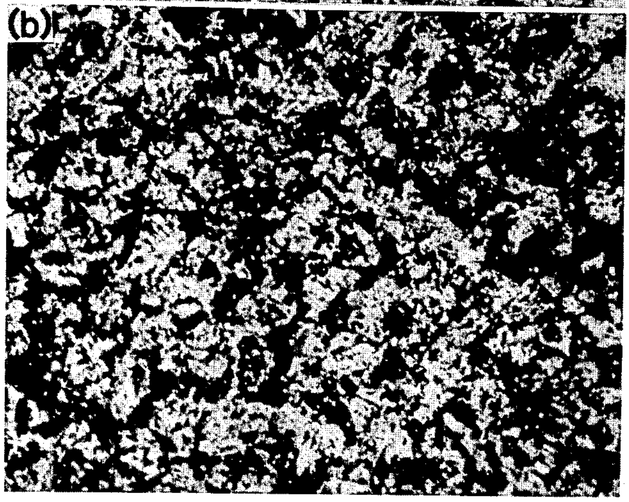
FIG. 7 consists of sectional view microphotographs of the product of the invention of compacted 10–20 μm grade diamond containing 7.2% by volume silicon as an additive, with FIG. 7(*a*) showing a polished top surface and FIG. 7(*b*) showing a polished bottom surface (magnification 10 μm per centimeter)
Figure 8A:
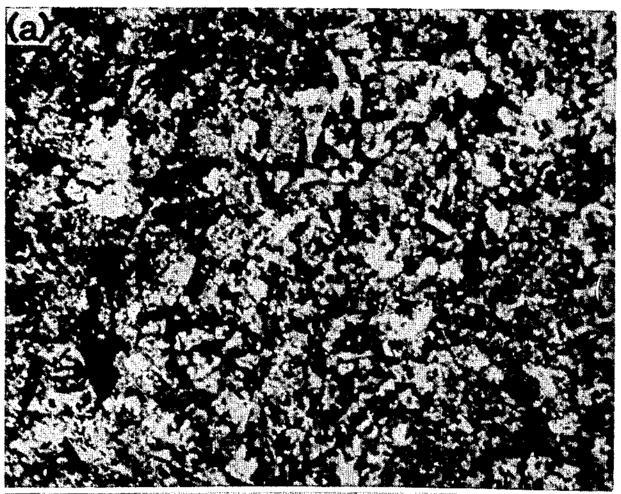
FIG. 8 consists of sectional view microphotographs of the product of the invention of compacted 10–20 μm grade diamond containing 7.2% by volume titanium as an additive, with FIG. 8(*a*) showing a polished top surface and FIG. 8(*b*) showing a polished bottom surface (magnification 10 μM per centimeter).
Figure 8B:
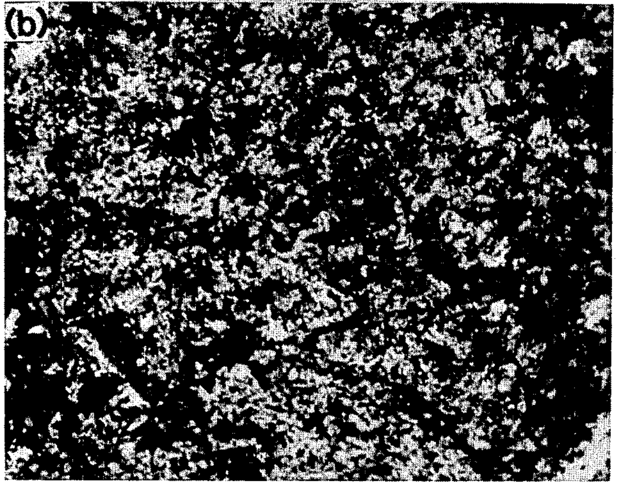

Optical micrographs of polished top and bottom surfaces of the compacted samples are shown in FIGS. 6–8. FIG. 6 shows the surfaces of a compact containing 100% by volume diamond; FIG. 7 shows the surfaces of a compact containing diamond and 7.2% by volume silicon as an additive; and FIG. 8 shows the surfaces of a compact containing diamond and 7.2% by volume titanium. Light-colored regions (domains) in these photographs correspond to the polished diamond grains, and continuous light-colored regions indicate a formation of interparticle bonding in compacted powders. In the compacted 10–20 μm grade diamond powders with silicon or titanium additives, interparticle bonding apparently increased by these additions. (Compare FIGS. 7 and 8 to FIG. 6.) Scanning electron microphotographs of the fracture surfaces of the compacted samples clearly show the difference in fracture morphology due to the difference in the degree of interparticle bonding produced during the dynamic-compaction process. Fracture morphology was changed from intergranular to transgranular fracture by the addition of titanium and silicon and transgranular fracture increased with an increasing amount of additive 0%–14% by volume silicon.

It will be appreciated from the foregoing description of the invention, as contrasted with the description of the prior art, that the present invention has achieved many improvements over the prior art. Notably, the invention permits the achievement of improved diamond composite materials with respect to toughness, hardness, decreased porosity and appearance. Furthermore, it permits the use of less expensive and less complicated powders. It permits the achievement of these improvements while eliminating the more expensive and complicated pressure devices of the prior art. It also simplifies the heating of the ingredients as contrasted with the more complicated furnaces of the prior art.

We claim:

1. A process for forming compacts of powders of ceramics, metals and cermets containing diamond powder and exothermically reactive additive powders comprising:

(a) mix high pressure phase diamond powder with non-stoichiometric exothermically reactive additive powders;

(b) compress the resulting mixture of powders into a compact; and (c) apply a shock wave to said compact which is sufficient to compress the compact, to reduce at least a portion of the high pressure phase diamond powder into a low pressure phase at a residual temperature, and to cause exothermic sintering of the powders, interparticle bonding, and a chemical reaction between the particles.

2. A process in accordance with claim 1 wherein the mixture contains between 40.0 percent and 99.9 percent diamond by volume and between 0.05 percent to 40.0 percent of exothermically reactive additive by volume of the diamond content.

3. A process in accordance with claim 1 wherein the size of the diamond powder is between 0.05 micorons and 1000 microns.

4. A process in accordance with claim 1 wherein said non-stoichiometric exothermically reactive additive comprises at least one constituent selected from the group consisting of boron, silicon, aluminum, transition metals, oxides, carbides, nitrides, carbonitrides, borides, silicides, and compounds thereof.

5. A process in accordance with claim 1 wherein said compact has a density of between 30 percent and 90 percent before the shock wave is applied.

6. A process in accordance with claim 1 wherein said shock wave is generated by the detonation of an explosive.

7. A process in accordance with claim 1 wherein said shock wave is generated by a high velocity impact.

8. An improved exothermically sintered and compressed compact of powders of ceramics, metals, and cermets comprising a mixture of high pressure phase diamond, high pressure phase diamond converted into a low pressure phase, and at least one non-stoichiometric exothermically reactive additive, and characterized by a high hardness, low cracking, and interparticle bonding, as a result of compressing the powders into the compact and applying a shock wave to the compact which is sufficient to cause exothermic sintering, interparticle bonding and a chemical reaction between particles of the powder, and to reduce a portion of the high pressure phase diamond powder into a low pressure phase at a residual temperature.

9. A compact in accordance with claim 8 wherein the resulting hardness of said compact is greater than 100 kg/mm$^2$.

10. A compact in accordance with claim 8 wherein the mixture contains between 40.0 percent and 99.9 percent diamond by volume and between 0.05 percent to 40.0 percent of exothermically reactive additive by volume of the diamond content.

11. A compact in accordance with claim 8 wherein said non-stoichiometric exothermically reactive additive comprises at least one constituent selected from the group consisting of boron, silicon, aluminum, transition metals, oxides, carbides, nitrides, carbonitrides, borides, silicides, and compounds thereof.

12. An improved exothermically sintered and compressed compact of powders of ceramics, metals, and cermets comprising a mixture of high pressure phase diamond converted into a low pressure phase, and at least one non-stoichiometric exothermically reactive additive and characterized by a high hardness, low cracking, and interparticle bonding, as a result of compressing the powders into the compact and applying a shock wave to the compact which is sufficient to cause exothermic sintering, interparticle bonding and a chemical reaction between particles of the powders, and to reduce all of the high pressure phase diamond powder into a low pressure phase at a residual temperature.

13. A process for forming a compact containing diamond powders comprising:

(a) compress high pressure phase diamond powder into a compact;

(b) apply a shock wave to said compact which is sufficient to compress the compact, to reduce at least a portion of the high pressure phase diamond powder into a low pressure phase at a residual temperature, and to cause exothermic sintering interparticle bonding and a chemical reaction between particles of the powders.

14. An improved exothermically sintered and compressed diamond compact comprising a mixture of high pressure phase diamond and high pressure phase diamond converted into a low pressure phase, and characterized by a high hardness, low cracking, and interparticle bonding, as a result of compressing the powders into a compact and applying a shock wave to the compact which is sufficient to cause exothermic sintering, interparticle bonding and a chemical reaction between particles of the powders, and to reduce at least a portion of the high pressure phase powder into a low pressure phase at a residual temperature.

* * * * *

UNITED STATES PATENT AND TRADEMARK OFFICE

CERTIFICATE OF CORRECTION

PATENT NO. : 4,695,321

DATED : September 22, 1987

INVENTOR(S) : Tamotsu Akashi and Akira Sawaoka

It is certified that error appears in the above-identified patent and that said Letters Patent are hereby corrected as shown below:

Column 16, line 4 of the Patent, change "micorons" to --microns--; and at line 35 change "100" to --1000--.

Signed and Sealed this

Fifth Day of January, 1988

*Attest:*

DONALD J. QUIGG

*Attesting Officer* *Commissioner of Patents and Trademarks*